(12) United States Patent
Uszkoreit et al.

(10) Patent No.: US 8,612,204 B1
(45) Date of Patent: Dec. 17, 2013

(54) TECHNIQUES FOR REORDERING WORDS OF SENTENCES FOR IMPROVED TRANSLATION BETWEEN LANGUAGES

(75) Inventors: Jakob David Uszkoreit, San Francisco, CA (US); John DeNero, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 118 days.

(21) Appl. No.: 13/310,016

(22) Filed: Dec. 2, 2011

Related U.S. Application Data

(60) Provisional application No. 61/469,426, filed on Mar. 30, 2011.

(51) Int. Cl.
*G06F 17/27* (2006.01)
(52) U.S. Cl.
USPC .............................................................. 704/2
(58) Field of Classification Search
USPC ..................................................... 704/2, 277
See application file for complete search history.

(56) References Cited

U.S. PATENT DOCUMENTS

| | | | |
|---|---|---|---|
| 5,493,606 A * | 2/1996 | Osder et al. ............... | 379/88.05 |
| 7,454,326 B2 * | 11/2008 | Marcu et al. .................... | 704/2 |
| 7,542,893 B2 * | 6/2009 | Cancedda et al. ............... | 704/2 |
| 7,698,125 B2 * | 4/2010 | Graehl et al. .................... | 704/5 |
| 8,214,196 B2 * | 7/2012 | Yamada et al. .................. | 704/2 |

* cited by examiner

*Primary Examiner* — Susan McFadden
(74) *Attorney, Agent, or Firm* — Remarck Law Group PLC

(57) ABSTRACT

Computer-implemented techniques include receiving a phrase in a first language and obtaining a corpus comprising a plurality of phrases in the first language and word reordering information for the plurality of phrases, the word reordering information indicating a correct word order for each phrase in a second language. Word-to-word correspondences between each of the phrases in the first language and the corresponding correct word order for the phrase in the second language are identified and at least one tree that allows for the identified word-to-word correspondences is generated. Based upon the at least one tree, a statistical model for reordering from a word order that is correct for the first language to a word order that is correct for the second language is created. Based upon the statistical model, a reordered phrase from the received phrase is generated, the reordered phrase having a correct word order for the second language.

19 Claims, 5 Drawing Sheets

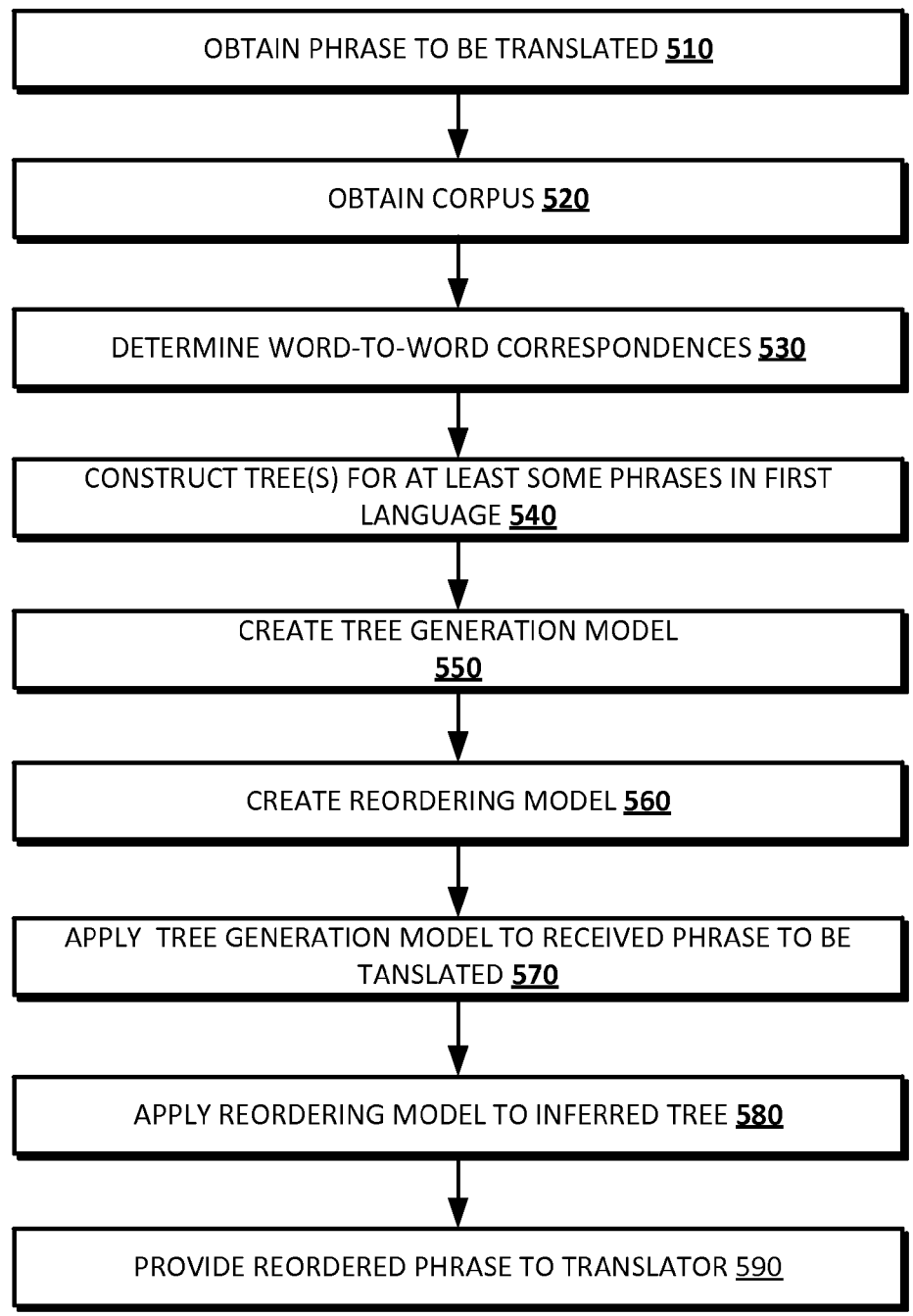

TECHNIQUES FOR REORDERING WORDS OF SENTENCES FOR IMPROVED TRANSLATION BETWEEN LANGUAGES

CROSS-REFERENCE TO RELATED APPLICATIONS

This application claims the benefit of U.S. Provisional Application No. 61/469,426, filed Mar. 30, 2011, the disclosure of which is incorporated by reference in its entirety.

BACKGROUND

Different languages may use different standard word orders in conventional sentence structures. For example, English typically uses a subject-verb-object sentence order, while German may use a different word order resulting from a preference for the verb to be the second word in each sentence. As another example, Japanese typically uses a subject-object-verb sentence structure.

When translating from one language to another with automated techniques such as machine translation, it may be necessary to identify and account for differences in sentence structure or syntax, i.e., the order in which words typically are placed in a sentence. If these differences are not accounted for, the translation may be inaccurate or have a different implied or explicit meaning from the original source sentence. For example, mechanically translating from a subject-verb-object language to a subject-object-verb language may result in a mis-translation, if the verb is not moved to the correct position in the target language. Thus, the target sentence may be read incorrectly or may be partially or completely nonsensical or confusing in meaning. An incorrect move also may impact the effectiveness of other models, such as a related language model, which may negatively impact fluency and translation accuracy.

To address this issue, machine translation systems may use pre-ordering techniques when translating between languages that use different sentence structures. Pre-ordering techniques attempt to rearrange a source sentence to match the target language structure, prior to translating the individual tokens in the source sentence. Some conventional pre-ordering techniques use a supervised parser to achieve an accurate ordering. Generally, supervised parsers include systems that automatically annotate sentences with their syntactic structure, based on human-generated annotations of syntactic structure on training examples. Other conventional pre-ordering techniques may attempt to re-order without the use of any parser.

BRIEF SUMMARY

Methods and systems according to an embodiment of the disclosed subject matter may provide for reordering of a source phrase for translation. In an embodiment, a phrase to be translated from a first language to a second language may be obtained. A corpus that includes a set of phrases in the first language and example translations of the set of phrases in the second language also may be obtained. The corpus may exclude at least a portion of the phrase to be translated. For each phrase pair in the corpus, a word-to-word correspondence between words in the phrase in the first language and the example translations of the phrase in the second language may be determined. Based upon the correspondences, a tree structure of the phrase in the first language, such as a binary tree, may be generated, where each node in the tree represents one or more words in the phrase and the tree maintains the detected word-to-word correspondence. A statistical reordering model based upon the trees may then be constructed for the corpus. The statistical reordering model may define a word reordering for the phrase to be translated such that applying the model to the phrase to be translated results in a re-ordered phrase suitable for the second language. The reordered phrase may be provided to a machine translator to translate the reordered phrase into the second language According to an embodiment, a phrase in a first language may be received. The phrase may be provided in a request from a user or other source. In an embodiment, the phrase may originate as part of a request to translate the phrase from the first language into a second language. A corpus obtained that includes a plurality of phrases in the first language and word reordering information for the plurality of phrases also may be received or otherwise obtained. The word reordering information may indicate a correct word order for each phrase in the corpus when translated to a second language. Word-to-word correspondences between each of the phrases in the first language and the corresponding correct word order for the phrase in the second language may then be identified, thus allowing for generation of at least one tree that allows for the identified word-to-word correspondences. Such trees may be generated by, for example, generating a plurality of trees, not all of which allow for the correspondences, and selecting one or more that properly allow for the identified word-to-word correspondences. A statistical model for reordering from a word order that is correct for the first language to a word order that is correct for the second language may be generated based upon the tree. In an embodiment, the process of generating the statistical model may include generating a statistical model of tree generation for phrases in the first language based upon the phrases in the corpus. The received phrase may then be reordered according to the model, where the reordered phrase has a correct word order for the second language. An embodiment also may generate a translation of the received phrase in the second language based upon the reordered phrase. Various machine learning techniques may be used to generate the statistical model.

A system according to an embodiment may include an input configured to receive a phrase in a first language, a computer-readable storage medium storing a corpus comprising a plurality of phrases in the first language and word reordering information for the plurality of phrases, where the word reordering information indicates a correct word order for each phrase in a second language; and a processor configured to obtain the corpus from the computer-readable storage medium, identify word-to-word correspondences between each of the phrases in the first language and the corresponding correct word order for the phrase in the second language, generate at least one tree that allows for the identified word-to-word correspondences, based upon the at least one tree, create a statistical model for reordering from a word order that is correct for the first language to a word order that is correct for the second language, and, based upon the statistical model, generating a reordered phrase from the received phrase, the reordered phrase having a correct word order for the second language.

Other features may be present in embodiments of the presently disclosed subject matter. For example, at least one tree may be a binary tree. A translation of the received phrase in the second language may be generated based upon the reordered phrase. A process of creating the statistical model may include generating a statistical model of tree generation for phrases in the first language based upon the phrases in the corpus. Techniques disclosed herein also may include receiving a request to translate the received phrase from the first language to the second language. Statistical model as disclosed may be generated using a machine learning technique, such as a probabilistic machine learning technique, a quasi-Newtonian machine learning technique, a margin-based machine learning technique, an online machine learning technique, or a combination thereof. The process of generating a tree may include generating a plurality of trees, at least one of which does not allow for the identified word-to-word correspondences; and selecting, from the generated trees, at least one tree. Word reordering information as disclosed herein may include known-good translations of the phrases in the corpus in the second language.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 5 shows an example of a process for generating and applying a reordering model according to an embodiment of the disclosed subject matter.

DETAILED DESCRIPTION

Figure 1A:
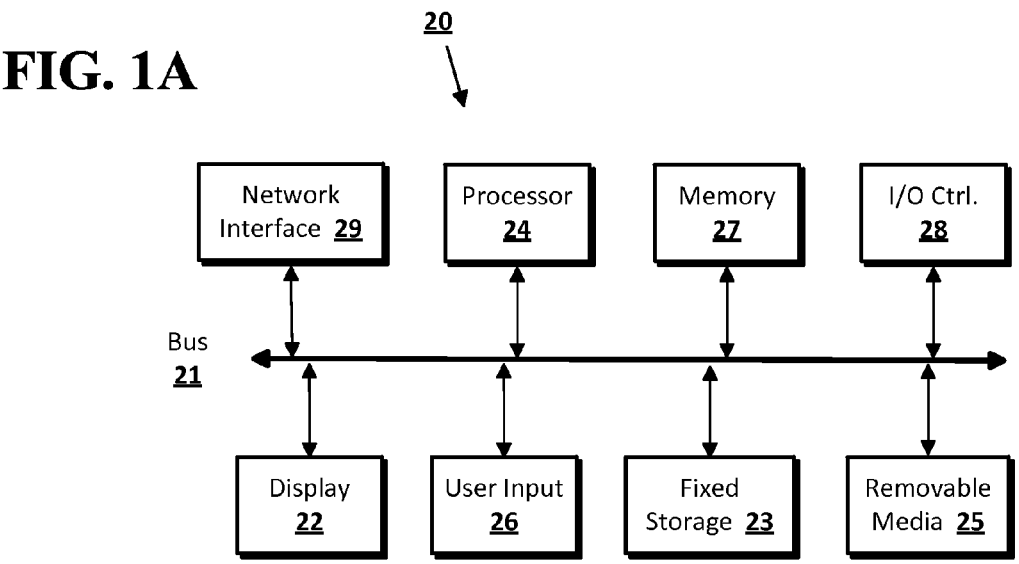
FIG. 1A shows a computer according to an embodiment of the disclosed subject matter.

When translating between languages that differ substantially in word order, machine translation systems may benefit from techniques that permute source tokens, such as words in a source sentence to be translated into a target sentence in a different language, into an ordering suitable for the target language based on a syntactic parse of the input. Embodiments of the presently disclosed subject matter provide techniques for hierarchical pre-ordering over induced parses. The techniques may be generated or learned automatically from a parallel corpus of example sentence structure, without the need for a conventional supervised parser, such as one that is trained on a treebank.

Statistical machine translation models generally define weighted mappings from source to target sentences, where the source sentence is in a first source language and the target sentence is in a second, different, target language. Such models may include three general components: a target-side language model, a lexical transfer model, and a distortion or reordering model.

Embodiments of the presently-disclosed subject matter provide techniques that may permute source sentences into a target-like order before applying the transfer or language models. The reordering techniques may be applied at both training and/or testing time, and may be dependent or conditioned on source-side syntactic structure. Techniques disclosed herein may be particularly effective at enforcing tree-rotating transformations, such as an ordering change from a subject-verb-object language such as English, to a subject-object-verb language such as Japanese. In contrast to conventional pre-ordering techniques that may require a human-supervised parser, embodiments of the presently disclosed subject matter may use syntax induction techniques that learn both a parsing model and a reordering model directly from a word-aligned parallel corpus, such as example translations from a source language to a target language. For example, a parallel corpus may include a set of sentences in a first language and corresponding known-correct translations of the sentences to a second language. The example translations may include known-correct translations, partially-correct translations, partially-incorrect or incorrect translations, and translations of unknown correctness. Generally, techniques disclosed herein may perform acceptably well even if some example translations in the corpus are incorrect, and/or if the majority of the example translations are correct. Techniques disclosed herein may be language-independent and may not require syntactic annotations or other human input, while still successfully predicting reordering phenomena.

Embodiments of the presently disclosed subject matter may reorder source sentences in two stages: parsing and tree reordering. In the first stage, a tree structure over the token sequence, such as a binary-branching parse tree, may be inferred. The parse tree may permit, for example, a particular subset of every possible reordering of the source sentence. As an example, only bracketings within a parse tree that properly separate main verbs from their object noun phrases may allow for a transformation needed to convert a subject-verb-object (SVO) order into a subject-object-verb (SOV) order.

In a second stage, a word reordering may be selected by inverting the order of some subset of binary productions in a parse tree. The reordering component may emphasize monolingual parsing as a first phase, and may select reorderings without the aid of a target-side language model. That is, the reordering may be performed without having access to, or first constructing, a complete model of the language to which source text is to be translated.

To train a parsing model for reordering, a learning criterion may be selected. Rather than inducing grammatical structure by maximizing likelihood of an observed sequence of words or other tokens, a structure may be selected that is effective for reordering. This may focus the explanatory power of the model on phenomena of interest for machine translation. For example, the conditional likelihood of source-side projections of synchronous parses of word aligned parallel sentences may be maximized. This may provide a feature-rich, log-linear parsing model without requiring supervised treebank data.

More generally, embodiments of the presently disclosed subject matter may examine example translations from a first language to a second language to construct syntactic structure, such as word grouping or hierarchy. A set of example translations from a particular first language to a particular second language may be referred to as a translation corpus. This structure then may be used as the basis for a model that reorders words in the first language to an order that is more suited to a second language. The reordering may be performed before any translation or other transformation to the second language is performed. That is, text in a first language may be kept in the first language until after the words in the text have been reordered. This may be an "unsupervised" process, i.e., requiring minimal or no human oversight to obtain a word order that is appropriate to the second language. Embodiments of the presently disclosed subject matter typically are applied to sentences or larger collections of text, but more generally may be applied to any size phrase that is to be translated from one language to another.

Figure 2:
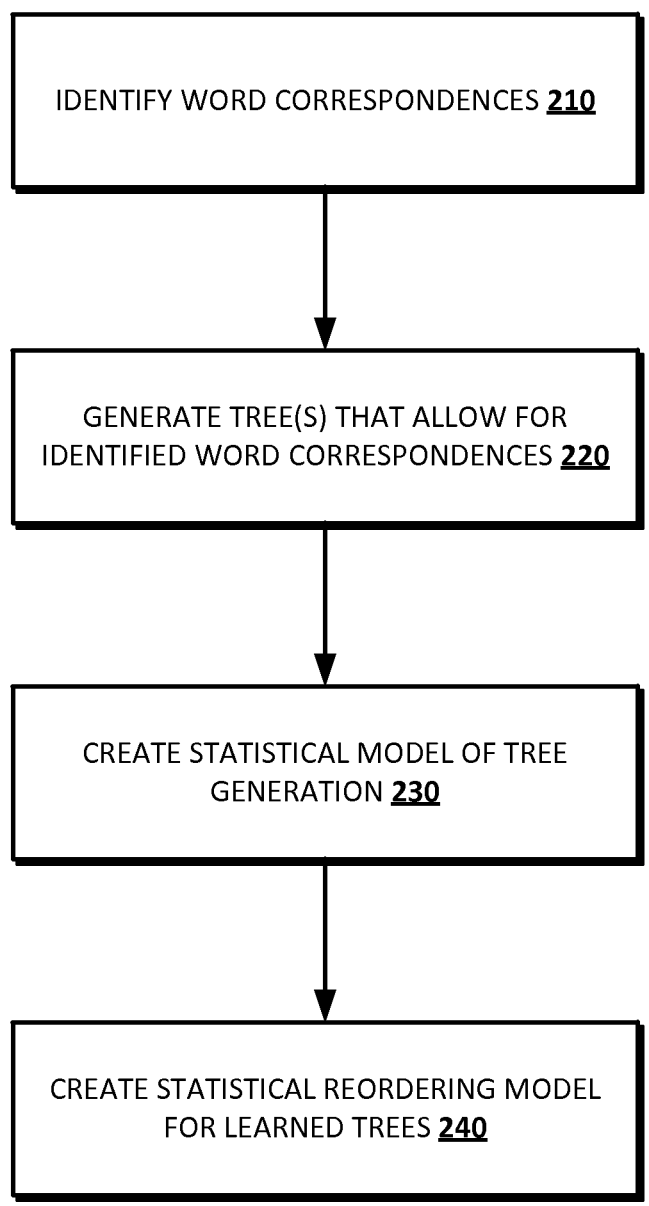
FIG. 2 shows an example process for reordering a phrase according to an embodiment of the disclosed subject matter.

FIG. 2 shows an example process for reordering a phrase, such as prior to translating the phrase from its initial language to another language, according to an embodiment of the disclosed subject matter. At 210, word-to-word correspondences may be identified between one or more phrases in a corpus, and the corresponding translation of the phrase in the corpus. As described above, a "corpus" may refer to a set of example translations, which may include known-good translations, between a first language and a second language. More generally, a "corpus" also may contain a set of phrases in a first language, and word order information for those phrases in the first and/or a second language. As a specific example, a corpus may include a set of sentences in English and the corresponding correct translations of the sentences in Japanese. Examples of word-to-word correspondences and their use are described in further detail in relation to FIGS. 3 and 4. The word-to-word correspondences may identify the position of each word and its corresponding translation within the original (first language) text and the translated (second language) text.

After identifying the word-to-word correspondences, one or more trees may be constructed at 220 for each phrase in the corpus. As will be understood by one of skill in the art, a tree may represent a set of potential word orders of the phrase in the first language, so the tree may be used to model a set of potential reorderings of the phrase. Typically, not every possible tree will be constructed or selected; rather, only trees that allow for the word-to-word correspondence identified for the phrase at 210 will be generated. For example, if it is determined from the word-to-word correspondence for a particular phrase and its translation that the first three words in the phrase in the first language become the last three words in the phrase in the second language, only trees that allow the first three words to be reordered to become the last three words will be constructed or selected. In some cases only those trees that allow for the identified word-to-word correspondence will be generated. In other cases it may be more desirable to generate each possible tree and select only those that allow for the correspondences. Although described and illustrated primarily with respect to binary trees, it will be understood that the techniques and systems disclosed herein may be used with any other suitable tree structure, including non-binary trees.

A tree structure may be generated for multiple pairs of phrases in the corpus to create a set of trees, each of which allows for the word-to-word correspondences identified at 210. Thus, a set of one or more trees may be generated for the corpus. The set of trees then may provide input to a machine learning process to create a statistical model that is capable of predicting a tree for a phrase in the first language that will allow for a correct reordering suitable for the second language, without relying upon the availability of the phrase in the second language.

At 230, a statistical model is generated that can predict the set of trees for the corpus, without using the example translations or the word order of the example translations, for each phrase. That is, the model is constructed to be capable of predicting an appropriate tree for a phrase in the corpus based only upon the phrase in the original first language. Because the model is based upon the trees generated at 220, it also allows only for those reorderings that maintain the word-to-word correspondences identified at 210. Thus, the word-to-word correspondences may be used to constrain the model to an appropriate subset of all possible reordering structures.

The statistical model generated at 230 may be created using any suitable machine learning technique. For example, a machine learning algorithm may be used that creates a function that depends upon the words, word pairs, punctuation, numerical values, or other attributes of each phrase in the first language. The function for each possible tree may be assigned a ranking score, where high scores are assigned to trees that allow for the word-to-word correspondences identified at 210, and low scores are assigned to trees that do not. Other features of the corpus phrases may be used to score the trees. For example, statistics regarding the frequency of various words occurring next to or near each other; the degree of variability of words that follow or precede a word, which may be scored relative to the previous n words in the phrase; comparison to other supervised or unsupervised grammar rules for the source phrase in the first language; and other statistical values may be used. Other attributes and features of the phrase in the target language or the function may be used in ranking the tree, as will be readily understood by one of skill in the art. Specific examples of machine learning techniques that may be suitable for generating the statistical model may include probabilistic, quasi-Newtonian, margin-based, and/or online techniques, specific examples of which may include a regularized conditional likelihood maximization via quasi-Newton methods, structured support vector machines, and structured perceptron techniques. Various other machine learning techniques may be used.

Similar to the model generated at 230, at 240 a model for reordering the trees may be generated or learned. For example, various reorderings may be generated and compared to the word order of example translations in the corpus. Those reorderings that have attributes which lead to a correct reordering may be scored relatively high, while those that do not may be scored relatively low. Attributes of the reorderings may be considered when assigning scores. For example, if a tree allows for adjectives to be reordered such that they follow the nouns they modify instead of preceding the nouns they modify, and this attribute matches the second language in the corpus, this attribute may give a positive contribution to the reordering score. If this is not a desirable feature for the second language, it may give a negative contribution to the score. Other attributes and features may be considered and, as disclosed with respect to 230, any suitable machine learning technique may be used to learn the correct reordering for one or more phrases in the corpus.

Figure 3A:
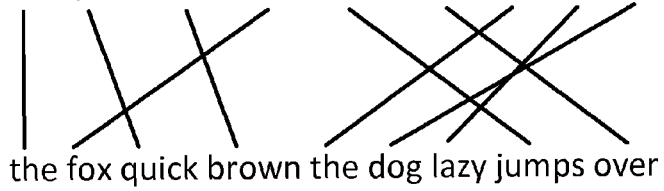
FIGS. 3A-3C show example word-to-word correspondences between a source phrase in a word order suitable for a first language, and a word order suitable for an illustrative second language.
Figure 3B:
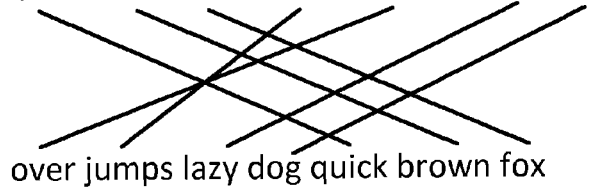
Figure 3C:
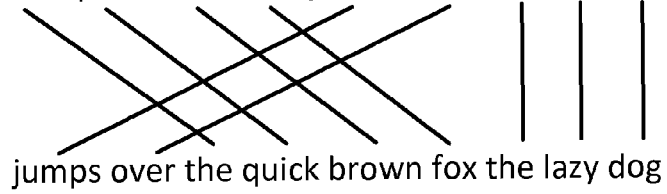

FIGS. 3A-3C show example word-to-word correspondences between a source phrase in a word order suitable for a first language ("The quick brown fox jumps over the lazy dog"), and a word order suitable for an illustrative second language. It will be understood that the illustrated word orders are intended as examples only, and may not correspond to a word order suitable for any specific real language. As shown by FIGS. 3A-3C, the word-to-word correspondences may provide information about patterns in word reordering between the first and second language for a particular corpus. For example, FIG. 3A shows a phrase from a corpus in which the first language (top) is a SVO language in which adjectives precede nouns, and the second language (bottom) is a SVO language in which adjectives follow nouns. In FIG. 3A, the words associated with the subject portion of the phrase do not shift to a different general part of the phrase, such as the middle or end. As another example, FIG. 3B shows a phrase pair from a corpus in which the second language is a VOS (verb-object-subject) language. As shown, the subject and object portions can be said generally to swap positions between the first and second language word orders. FIG. 3C shows another example in which the second language is a verb-subject-object language; as shown, the object portions of the phrase do not shift during an appropriate reordering.

The phrase pairs shown in FIGS. 3A-3C may represent example word reorderings for given first and second languages. As previously described, a parse tree for each phrase that allows for the illustrated reorderings may be constructed or selected from among a series of possible parse trees.

Figure 4A:
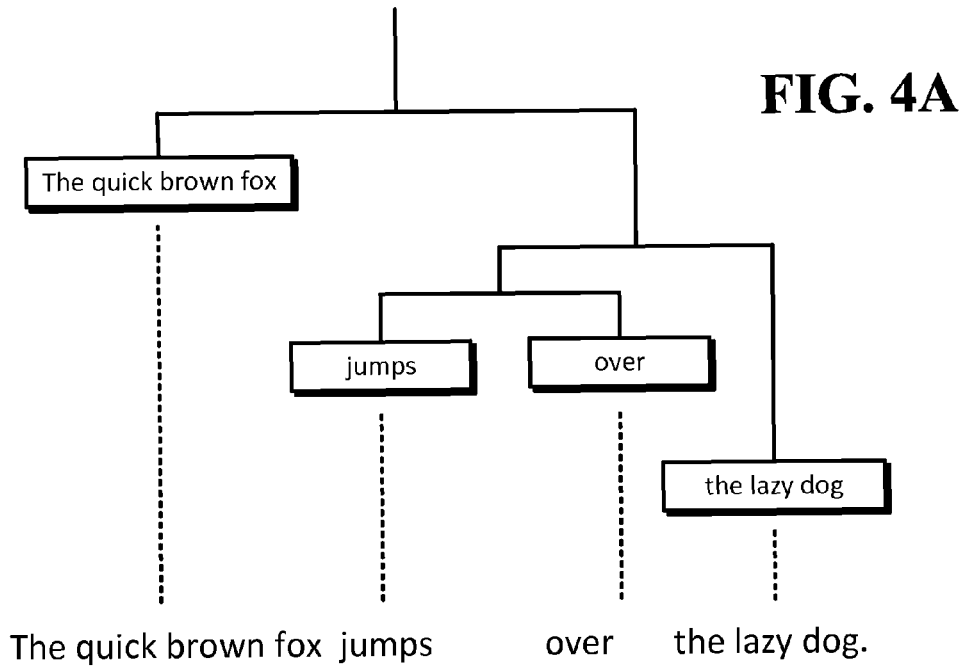
FIGS. 4A and 4B show example schematic representations of a parse tree according to an embodiment of the disclosed subject matter.
Figure 4B:
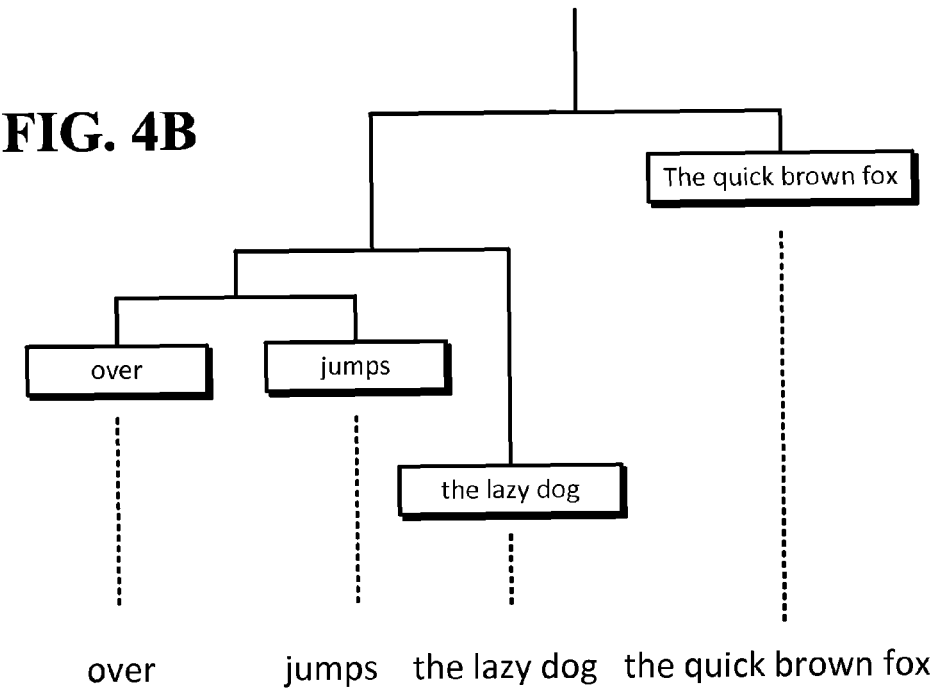

FIGS. 4A and 4B show example schematic representations of such a parse tree. It will be understood that the specific arrangement and representation shown in FIGS. 4A-4B are illustrative only, and that other types and representations of parse trees may be used. As an example, FIG. 4A shows one possible parse tree for the phrase illustrated in FIGS. 3A-3C, "The quick brown fox jumps over the lazy dog". In general, a parse tree allows for certain reorderings of the words in the phrase, and disallows others. For example, the tree structure shown in FIG. 4A allows for word orders that may be formed by swapping branches of the tree, while disallowing those that cannot be formed by swapping branches. As a specific example, FIG. 4A allows for the word order "over jumps the lazy dog the quick brown fox". To achieve this order, the nodes of the parse tree may be rearranged by swapping left and right branches to arrive at the arrangement shown in FIG. 4B. As another example, the word order "jumps over the quick brown fox the lazy dog" is now allowed by the tree structure shown in FIG. 4A, because there is no set of node exchanges that will result in a tree that has that word order.

Reordering models learned from corpora as disclosed herein may be used during machine translation of a phrase from the first language to the second language in which phrases are stored in the corpora. That is, a corpus that includes word order information for phrases in a first and second language may be used to generate reordering models as described herein, which may then be used to translate phrases from the first language to the second language. The translated phrases typically will be phrases not included in the corpus, though they may include words, word combinations, or phrases that are in the corpus.

FIG. 5 shows an example of a more detailed process for generating and applying a reordering model according to an embodiment of the disclosed subject matter. At 510, a phrase to be translated from a first language to a second language may be obtained. For example, the phrase may be received from a user, a preprocessor, or any other suitable source. The phrase may be received before or after one or more reordering models have been created as disclosed herein and as illustrated in FIG. 5. A corpus associated with the first and second languages may be accessed at 520. The corpus may include pairs of phrases in the first language and their example translations in the second language, and/or word order information for the phrase pairs. At 530, for each phrase pair, a word-to-word correspondence between words in the phrase in the first language and the example translations of the phrase in the second language may be determined. A tree then may be constructed for each phrase in the first language at 540, where each node in the tree represents one or more words in the phrase and the tree maintains the detected word-to-word correspondence. As previously disclosed, word-to-word correspondences generally may be maintained by constructing or selecting only trees that allow for the correspondences when reordering from the phrase in the first language to the word order suitable for the phrase in the second language.

As previously disclosed, at 550 a tree generation technique may be generated based upon the trees constructed for the phrase pairs in the corpus at 540. The tree generation technique may provide a mechanism to generate a suitable tree for an arbitrary phrase in the first language. As previously described, it may be created by generating multiple trees, and verifying that the generated trees preserve the word-to-word correspondences and/or other features that are desirable when reordering a phrase for the second language. At 560, a statistical reordering model may be created based upon the trees. The model may define, for example, a word reordering for the phrase to be translated or an arbitrary phrase in the first language. The model may define a reordering for the phrase that was received at 510 by including the reordering explicitly, or by providing a function that can be used to accomplish the correct reordering or otherwise generate such a reordering definition. At 570, the tree generation model may be applied to a received phrase to be translated. The reordering model may then be applied to the inferred tree at 580. The reordered phrase may then be provided to a translator at 590, such as a machine translator, that is configured to translate the reordered phrase into a phrase in the second language.

The attached appendix provides a detailed, non-limiting illustration of an embodiment of the disclosed subject matter. For example, Section 2.2 of the appendix describes in further detail an example of constructing parse trees that allow for the example reorderings in a corpus. Section 2.3 similarly provides a non-limiting illustration of generating parse trees that allow for example reorderings, without considering the source phrases in a corpus. Other features of embodiments of the disclosed subject matter are also described in the appendix. For example, Section 3.5 discloses a technique of separating a corpus into two portions, one of which is used for machine learning of parse tree creation and reordering, and the second for verifying the learned trees and reordering techniques.

Embodiments of the presently disclosed subject matter may be implemented in and used with a variety of component and network architectures. FIG. 1 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 1B.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 1B:
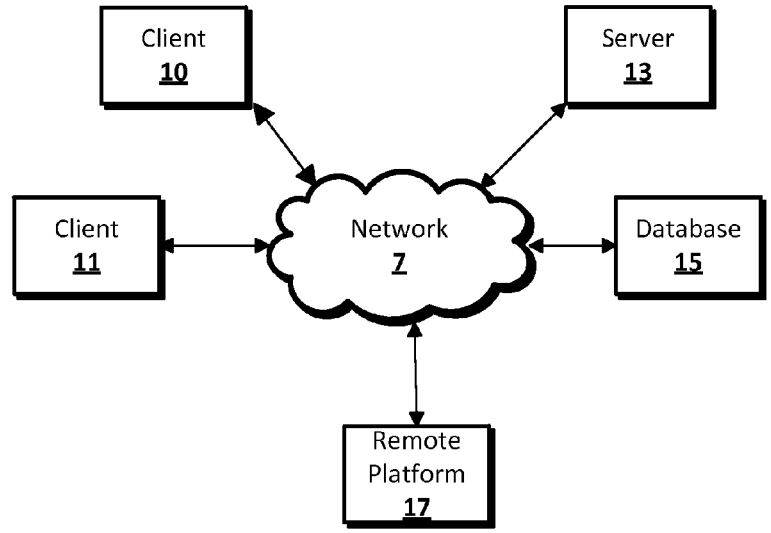
FIG. 1B shows a network configuration according to an embodiment of the disclosed subject matter.

FIG. 1B shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:

obtaining, at a computing device including one or more processors, a phrase to be translated from a first language to a second language;

for each phrase pair in a corpus, the corpus comprising a set of phrases in the first language and example translations of the set of phrases in the second language, and excluding the phrase to be translated:

determining, at the computing device, a word-to-word correspondence between words in the phrase in the first language and the example translations of the phrase in the second language; and constructing, at the computing device, a tree of the phrase in the first language, each node in the tree representing one or more words in the phrase, the tree maintaining the detected word-to-word correspondence;

constructing, at the computing device, a statistical reordering model based upon the trees constructed for the corpus, the statistical reordering model defining a word reordering for the phrase to be translated;

applying, at the computing device, the statistical reordering model to the phrase to be translated to obtain a reordered phrase; and providing, at the computing device, the reordered phrase to a machine translator configured to translate the reordered phrase into a phrase in the second language.

2. A computer-implemented method comprising:

receiving, at a computing device including one or more processors, a phrase in a first language;

obtaining, at the computing device, a corpus comprising a plurality of phrases in the first language and word reordering information for the plurality of phrases, the word reordering information indicating a correct word order for each phrase in a second language;

identifying, at the computing device, word-to-word correspondences between each of the phrases in the first language and the corresponding correct word order for the phrase in the second language;

generating, at the computing device, at least one tree that allows for the identified word-to-word correspondences;

based upon the at least one tree, creating, at the computing device, a statistical model for reordering from a word order that is correct for the first language to a word order that is correct for the second language; and based upon the statistical model, generating, at the computing device, a reordered phrase from the received phrase, the reordered phrase having a correct word order for the second language.

3. The method of claim 2, wherein each at least one tree is a binary tree.

4. The method of claim 2, further comprising the step of generating a translation of the received phrase in the second language based upon the reordered phrase.

5. The method of claim 2, wherein the step of creating the statistical model further comprises generating a statistical model of tree generation for phrases in the first language based upon the phrases in the corpus.

6. The method of claim 2, further comprising receiving a request to translate the received phrase from the first language to the second language.

7. The method of claim 2, wherein the statistical model is generated using a machine learning technique.

8. The method of claim 7, wherein the machine learning technique comprises a probabilistic machine learning technique, a quasi-Newtonian machine learning technique, a margin-based machine learning technique, an online machine learning technique, or a combination thereof.

9. The method of claim 2, wherein the step of generating the at least one tree further comprises:

generating a plurality of trees, at least one of which does not allow for the identified word-to-word correspondences; and selecting, from the plurality of generated trees, the at least one tree.

10. The method of claim 2, wherein the word reordering information comprises known-good translations of the phrases in the corpus in the second language.

11. A system comprising:

an input configured to receive a phrase in a first language;

a non-transitory computer-readable storage medium storing a corpus comprising a plurality of phrases in the first language and word reordering information for the plurality of phrases, the word reordering information indicating a correct word order for each phrase in a second language; and a processor configured to:

obtain the corpus from the computer-readable storage medium;

identify word-to-word correspondences between each of the phrases in the first language and the corresponding correct word order for the phrase in the second language;

generate at least one tree that allows for the identified word-to-word correspondences;

based upon the at least one tree, create a statistical model for reordering from a word order that is correct for the first language to a word order that is correct for the second language; and based upon the statistical model, generate a reordered phrase from the received phrase, the reordered phrase having a correct word order for the second language.

12. The system of claim 11, wherein each at least one tree is a binary tree.

13. The system of claim 11, said processor further configured to generate a translation of the received phrase in the second language based upon the reordered phrase.

14. The system of claim 11, wherein the step of creating the statistical model further comprises generating a statistical model of tree generation for phrases in the first language based upon the phrases in the corpus.

15. The system of claim 11, said input further configured to receive a request to translate the received phrase from the first language to the second language.

16. The system of claim 11, wherein the statistical model is generated using a machine learning technique.

17. The system of claim 11, wherein the machine learning technique comprises a probabilistic machine learning technique, a quasi-Newtonian machine learning technique, a margin-based machine learning technique, an online machine learning technique, or a combination thereof.

18. The system of claim 11, wherein the step of generating the at least one tree further comprises:

generating a plurality of trees, at least one of which does not allow for the identified word-to-word correspondences; and selecting, from the plurality of generated trees, the at least one tree.

19. The system of claim 11, wherein the word reordering information comprises known-good translations of the phrases in the corpus in the second language.

* * * * *